(12) United States Patent
Perkowitz et al.

(10) Patent No.: US 9,020,864 B2
(45) Date of Patent: Apr. 28, 2015

(54) RECOMMENDATION AGENT USING A PERSONALITY MODEL DETERMINED FROM MOBILE DEVICE DATA

(71) Applicant: ARO, Inc., Seattle, WA (US)

(72) Inventors: Michael Perkowitz, Seattle, WA (US); Kevin Francis Eustice, Seattle, WA (US); Andrew F. Hickl, Seattle, WA (US)

(73) Assignee: ARO, Inc., Seattle, WA (US)

( * ) Notice: Subject to any disclaimer, the term of this patent is extended or adjusted under 35 U.S.C. 154(b) by 0 days.

(21) Appl. No.: 13/950,117

(22) Filed: Jul. 24, 2013

(65) Prior Publication Data

US 2014/0032452 A1    Jan. 30, 2014

Related U.S. Application Data

(60) Provisional application No. 61/675,733, filed on Jul. 25, 2012, provisional application No. 61/675,732, filed on Jul. 25, 2012.

(51) Int. Cl.
| | |
|---|---|
| *G06N 5/02* | (2006.01) |
| *G06N 99/00* | (2010.01) |
| *H04W 4/02* | (2009.01) |
| *G06F 17/27* | (2006.01) |
| *G06Q 30/06* | (2012.01) |
| *G06F 17/30* | (2006.01) |
| *H04W 4/20* | (2009.01) |

(52) U.S. Cl.
CPC ............. *H04W 4/02* (2013.01); *G06F 17/2785* (2013.01); *G06Q 30/0631* (2013.01); *G06N 5/02* (2013.01); *G06N 99/005* (2013.01); *G06F 17/30876* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 6,581,058 | B1 | 6/2003 | Fayyad et al. |
| 6,655,963 | B1 * | 12/2003 | Horvitz et al. ................ 434/236 |
| 7,251,637 | B1 | 7/2007 | Caid et al. |
| 7,421,155 | B2 | 9/2008 | King et al. |
| 7,526,458 | B2 | 4/2009 | Flinn et al. |
| 7,702,635 | B2 | 4/2010 | Horvitz et al. |
| 8,224,714 | B2 | 7/2012 | Yost |
| 8,412,665 | B2 | 4/2013 | Wang et al. |
| 8,601,095 | B1 | 12/2013 | Carlson et al. |

(Continued)

OTHER PUBLICATIONS

Bellotti, V., et al. "Activity-based serendipitous recommendations with the Magitti mobile leisure guide." Proceedings of the SIGCHI Conference on Human Factors in Computing Systems. ACM, 2008.*

(Continued)

*Primary Examiner* — Kakali Chaki
*Assistant Examiner* — Eric Nilsson
(74) *Attorney, Agent, or Firm* — Fenwick & West LLP

(57) ABSTRACT

A user's context history is analyzed to build a personality model describing the user's personality and interests. The personality model includes a plurality of metrics indicating the user's position on a plurality of personality dimensions, such as desire for novelty, tendency for extravagance, willingness to travel, love of the outdoors, preference for physical activity, and desire for solitude. A customized recommendation agent is then built based on the personality model, which selects a recommendation from a corpus to present to the user based on an affinity between the user's personality and the selected recommendation.

18 Claims, 8 Drawing Sheets

(56) References Cited

U.S. PATENT DOCUMENTS

| | | |
|---|---|---|
| 8,606,636 B1 | 12/2013 | Keoshkerian |
| 8,655,307 B1 | 2/2014 | Walker et al. |
| 2002/0049816 A1 | 4/2002 | Costin et al. |
| 2002/0052934 A1 | 5/2002 | Doherty |
| 2002/0078204 A1 | 6/2002 | Newell et al. |
| 2002/0143263 A1 | 10/2002 | Shusterman |
| 2003/0018430 A1 | 1/2003 | Ladetto et al. |
| 2004/0162830 A1 | 8/2004 | Shirwadkar et al. |
| 2005/0186965 A1 | 8/2005 | Pagonis et al. |
| 2006/0026048 A1* | 2/2006 | Kolawa et al. ............ 705/7 |
| 2006/0029296 A1 | 2/2006 | King et al. |
| 2006/0041828 A1 | 2/2006 | King et al. |
| 2006/0053097 A1 | 3/2006 | King et al. |
| 2006/0217990 A1 | 9/2006 | Theimer et al. |
| 2007/0006098 A1 | 1/2007 | Krumm et al. |
| 2007/0118498 A1 | 5/2007 | Song et al. |
| 2008/0097820 A1 | 4/2008 | Koran et al. |
| 2009/0124241 A1 | 5/2009 | Krishnaswamy et al. |
| 2009/0132905 A1 | 5/2009 | Hoshino |
| 2009/0216847 A1 | 8/2009 | Krishnaswamy et al. |
| 2009/0240647 A1 | 9/2009 | Green et al. |
| 2010/0036643 A1 | 2/2010 | Marvasti et al. |
| 2010/0070448 A1 | 3/2010 | Omoigui |
| 2010/0082301 A1 | 4/2010 | Skibiski et al. |
| 2010/0161619 A1 | 6/2010 | Lamere et al. |
| 2010/0228590 A1 | 9/2010 | Muller et al. |
| 2010/0286899 A1 | 11/2010 | Jain et al. |
| 2010/0332124 A1 | 12/2010 | Bhatt |
| 2011/0040756 A1 | 2/2011 | Jones et al. |
| 2011/0087688 A1 | 4/2011 | Midtun et al. |
| 2011/0154119 A1 | 6/2011 | Wang et al. |
| 2011/0154264 A1 | 6/2011 | Aravamudan et al. |
| 2012/0030062 A1 | 2/2012 | Stauffer et al. |
| 2012/0072381 A1* | 3/2012 | Cao et al. ............ 706/12 |
| 2012/0088525 A1 | 4/2012 | Kurokawa et al. |
| 2012/0117006 A1 | 5/2012 | Sathish |
| 2012/0123993 A1 | 5/2012 | Wang et al. |
| 2012/0253548 A1 | 10/2012 | Davidson |
| 2012/0317161 A1 | 12/2012 | Bai et al. |
| 2013/0022282 A1 | 1/2013 | Cooper |
| 2014/0025660 A1 | 1/2014 | Mohammed et al. |
| 2014/0032208 A1 | 1/2014 | Liu et al. |
| 2014/0032358 A1 | 1/2014 | Perkowitz et al. |
| 2014/0032453 A1 | 1/2014 | Eustice et al. |
| 2014/0032572 A1 | 1/2014 | Eustice et al. |

OTHER PUBLICATIONS

Adomavicius, G. et al., "Towards the Next Generation of Recommender Systems: A Survey of the State-of-the-Art and Possible Extensions," *IEEE Transactions on KDE*, 2005, pp. 734-749.

PCT International Search Report and Written Opinion, PCT Application No. PCT/US2013/051909, Dec. 2, 2013, sixteen pages.

Baltrunas, L. et al., "Towards Time-Dependent Recommendation based on Implicit Feedback," *Workshop on Context-Aware Recommender System (CARS '09)*, Oct. 25, 2009, New York, USA, five pages.

\* cited by examiner

RECOMMENDATION AGENT USING A PERSONALITY MODEL DETERMINED FROM MOBILE DEVICE DATA

CROSS-REFERENCE TO RELATED APPLICATION

This application claims the benefit of U.S. Provisional Application No. 61/675,733, filed Jul. 25, 2012, entitled "Recommendation Agents Using Routine, Personality, Learning, and Sharing," and U.S. Provisional Application No. 61/675,732, filed Jul. 25, 2012, entitled "Creating a Storyline from Mobile Device Data," both of which are incorporated herein by reference in their entirety.

BACKGROUND

1. Technical Field

The described embodiments pertain to making recommendations to a user based on location data and other data collected from mobile devices.

2. Description of Related Art

A variety of personalized recommendation systems currently exist. These systems typically record user events (such as purchases of particular products) and/or preferences (such as ratings of products and media) to generate a model for the user. This model is then used to recommend "similar" items to the user. However, there are a number of obstacles to building useful applications on top of the kinds of user models currently available.

First, existing models are not very effective until the system has observed a great deal of user behavior or preferences. Second, the interests and tastes of a typical user are more nuanced than the general genres and/or category preferences that existing models generate. Third, existing models recommend things similar to what the user has seen before, whereas many users are interested in being presented with new options to explore.

As a result, many recommendation systems are limited in their usefulness to particular scenarios. For example, they may help a pizza fan find more pizza restaurants, a science fiction fan find more science fiction novels, or a lover of romantic comedies starring Jennifer Aniston find more romantic comedies starring Jennifer Aniston. However, they cannot help the pizza fan find a great burger joint, the science fiction fan find her friend's favorite science fiction novel, or the Jennifer Aniston fan find a bar that makes a great Martini.

SUMMARY

Embodiments of the invention include a method, a non-transitory computer readable storage medium and a system for creating a customized recommendation agent that makes recommendations to the user based on a context-based routine model for the user. A context is a (possibly partial) specification of what a user was doing in the dimensions of time, place, and activity. Each of these dimensions may be defined specifically (e.g., location defined by latitude 47.60621, longitude −122.332071) or very generally (e.g., the location "Seattle, Wash."), or entirely unspecified (e.g., omitted or a default value). They may also be ascribed varying degrees of semantic meaning (e.g., "Seattle" contains more semantic information than "47.60621, −122.332071"). A context can represent a stay in a certain location or travel from one place to another. Contexts may have probabilities associated with them. In some cases, contexts may be inferred from evidence rather than known with certainty. Thus, contexts can vary in their specificity, their semantic content, and their likelihood.

A user's context history is analyzed to build a personality model describing the user's personality and interests. The personality model includes a plurality of metrics indicating the user's position on a plurality of personality dimensions, such as desire for novelty, tendency for extravagance, willingness to travel, love of the outdoors, preference for physical activity, and desire for solitude. A customized recommendation agent is then built based on the personality model, which selects a recommendation from a corpus to present to the user based on an affinity between the user's personality and the selected recommendation.

Embodiments of the computer-readable storage medium store computer-executable instructions for performing the steps described above. Embodiments of the system further comprise a processor for executing such computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention make recommendations to a user based on the user's routine and/or metrics describing the user's personality, as determined from context slices generated from observed data. A context is a (possibly partial) specification of what a user was doing in the dimensions of time, place, and activity. Contexts can vary in their specificity, their semantic content, and their likelihood. Raw context data can be collected from a variety of observation sources with various error characteristics. Slicing refines the chaotic collection of contexts produced by data collection into consistent segments, called slices, each with a corresponding set of contexts. Accordingly, the slices and corresponding context data are then available for further processing, such as determining features of the user's routine and/or metrics describing the user's personality.

System Overview

Figure 1:
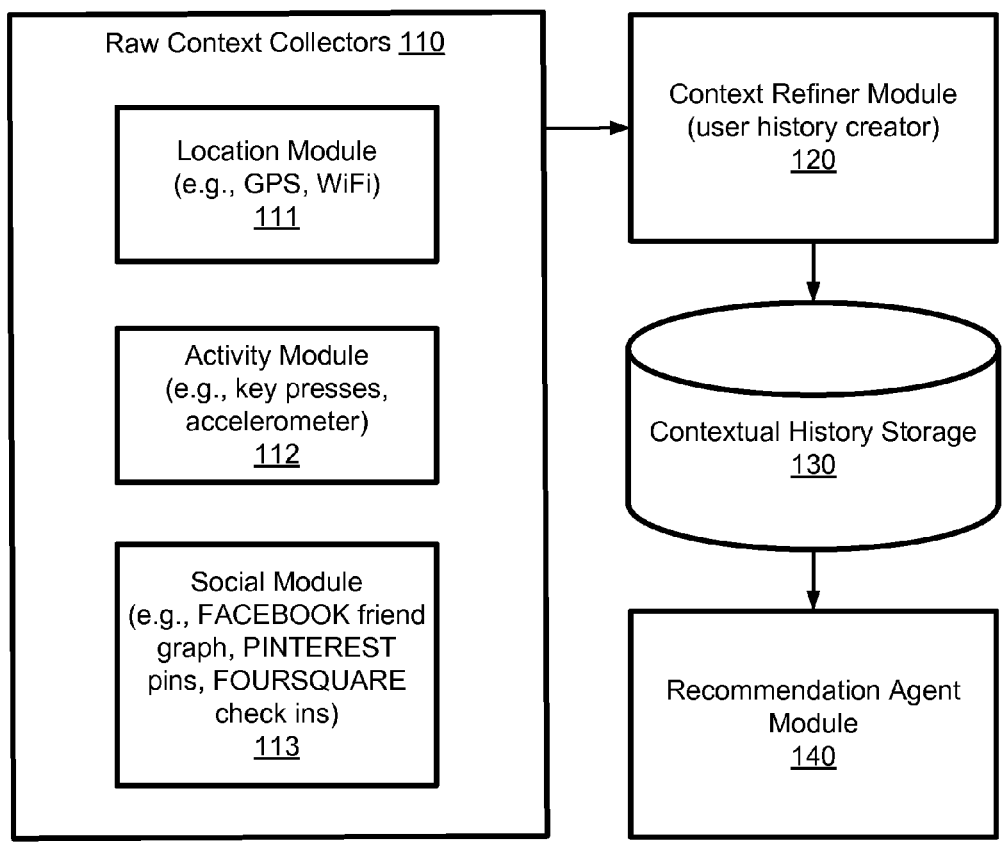
FIG. 1 is a block diagram illustrating the system environment for creating and using recommendation agents in accordance with an embodiment of the invention.

FIG. 1 is a block diagram illustrating the system environment 100 for creating and using recommendation agents, in accordance with an embodiment of the invention. The system environment 100 includes one or more raw context collectors 110, a context refiner module 120, contextual history storage 130, and a recommendation agent module 140. In one embodiment, the entities of the system environment 100 may be contained on a single processing node, such as a user's mobile device, and in another embodiment, the entities of the system environment may be divided between the user's mobile device and a centralized processing node to decrease the processing requirements of the mobile device. An example distributed embodiment is one where the raw context collectors 111 are located on the user's mobile device and data is sent to a central device for context refinement, storage, and agent building.

The raw context collectors 110 collect raw context data from observation sources, sensors, monitors, third party sources, and the like. A raw context represents a single observation and so is generally very specific, often carries little semantic information on its own, and is of high probability. Naturally, different observation sources may have greater degrees of noise and uncertainty or may inherently include semantic information. In the example illustrated in FIG. 1, the raw context collectors 110 include a location module 111, an activity module 112, and a social module 113, but different and/or other context collectors 110 may be included in other embodiments. For example, in various embodiments, the context collectors include sensors for measuring device orientation (e.g., a compass), magnetic fields, user heart rate, and user stress level, as well as modules for audio and visual sampling of the user's environment.

Examples of location module 111 include a GPS receiver, and a Wi-Fi receiver that enable the location module 111 to determine an absolute or relative location of the user's mobile device, within a margin of error. Examples of the activity module 112 include, a monitor of key presses that determines when a user is typing or otherwise interacting with the user's mobile device, and an accelerometer that measures the acceleration forces on the mobile device to determine movement and movement patterns of the mobile device. Examples of social module 113 include a FACEBOOK friend graph, PINTEREST pins, FOURSQUARE check ins, and other social media data that identify a user's social acquaintances, activities, and locations.

The context refiner module 120 receives the raw context data from the raw context collectors 110. The context refiner module 120 groups the context data by combining the observations into slices in order to create a more coherent representation of the user's context during the time range represented by the slice. Each slice includes one or more contexts that apply to the user for the time range corresponding to the slice. The context refiner module 120 may also attach semantic content to a slice or sequence of slices to provide additional contextual information, such as an activity that the slice or slices represent, general locations like a city or neighborhood, specific business locations, the time of day, or the day of the week. In some embodiments, the context refiner module 120 includes a plurality of context refiner sub-modules (not shown); one for each type of context data received from the raw context collectors 110. Each context refiner sub-module groups context data by combining the observations from the corresponding raw context collector 110 into slices in order to create a more coherent representation of the user's context indicated by the specific type of context data the sub-module is operating on. In one such embodiment, the context refiner module 120 includes an additional refiner sub-module (not shown) that analyzes the multiple streams of contexts generated by the other context refiner sub-modules to detect overlapping slices and generate combined slices containing context information from the corresponding overlapping slices.

The contextual history storage 130 receives the slices formed by the context refiner module 120 from a user's raw contextual data and stores them in association with an identifier of the user. Thus, the contextual history storage 130 contains a collection of slices that collectively describe the user's contextual history. This collection may consist of multiple parallel streams of contextual information as well as a single master stream composing all these contexts together. The recommendation agent module 140 can then access the stored slices in order to build recommendation agents (and make recommendations) that are customized for the user. The processes of creating slices and building customized recommendation agents will be described in detail in the sections below.

Figure 2:
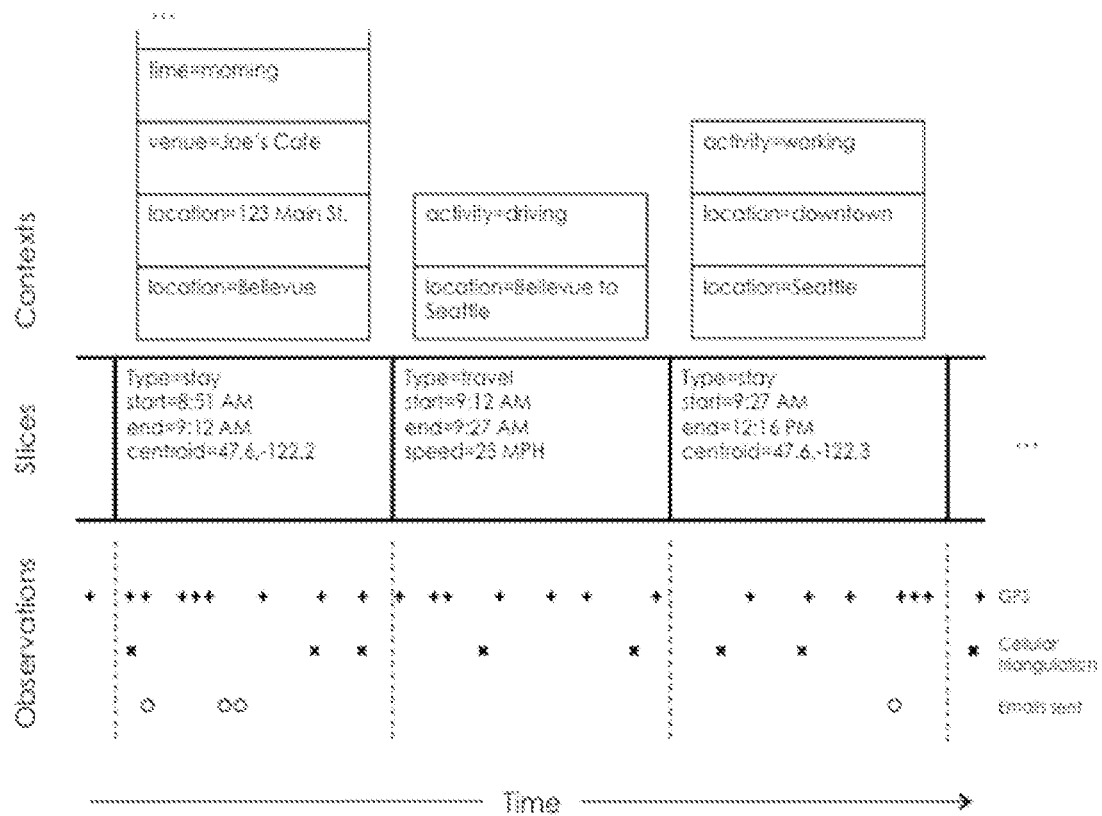
FIG. 2 is a diagram illustrating the relationship of sensor data, slices, and contexts in accordance with an embodiment of the invention.

FIG. 2 is a diagram illustrating the relationship of sensor data, slices, and contexts, in accordance with an embodiment of the invention. FIG. 2 illustrates observations, which are the collections of sensor data from a mobile device. In this example, the observations include Global Positioning System readings, Cellular triangulation signals, and emails sent from the device. The points along the time axis at which these observations are collected are marked. As a result of these observations, the user's time can be divided into a sequence of slices. In this example, each slice has a type and a start and end time. In this example, the type is either "stay" or "travel" and the start and end times establish the limits or boundaries of the slice. For "stay" type slices, the slice also has a centroid location, and for "travel" type slices, the slice also has a speed of the travel. In this example, based on the division of observations into time slices, a variety of metadata representing contexts have been attached to the slices. The metadata may describe the dimensions of time, place, and activity of the user at various levels of generality. For example, the first slice is associated with a place dimension of the context at various levels of generality/specificity: at a city level, a street address level, and a venue level.

Contextual History Creation Process

Figure 3:
FIG. 3 is a flow chart illustrating a process of creating and updating a user's contextual history in accordance with an embodiment of the invention.

Embodiments of the invention divide the process of the creation and updating of a user's contextual history into three phases: data collection, slicing, and labeling. These phases are illustrated in the flow chart of FIG. 3, and described in detail in this section.

Data Collection 301

Data collection 301 involves accessing the various sources of information and observations of user behavior, optionally transporting their data to servers for analysis and storage (to offload CPU load and reduce battery usage), and translating the data into a collection of raw contexts for additional analysis. These observations may come from a variety of sources, including but not limited to the following:

Location technologies (e.g., GPS, cell tower triangulation, Wi-Fi location), typically embedded in mobile devices like smartphones. The location technologies may be included, for example, in the location module 111.

Activity data such as accelerometer data from mobile devices and device interaction notices (e.g. taps, key presses, power on). The activity data may be collected, for example, by the activity module 112.

Ambient data from the user's environment (e.g., sound, temperature, or light intensity).

Biometric data such as the user's skin temperature, galvanic skin response, heat flux, and heart rate. This data may be used to calculate caloric burn, stress level, sleep quality, and other indicators of the user's physical state.

Social data from any networks or applications the user may use, such as FACEBOOK, TWITTER, FOURSQUARE, FLICKR, or PINTEREST, as well as personal communication applications like email and text messaging. The social data may be collected, for example, by the social module 113. In one embodiment, the social data is made available to the social module 113 through application programming interfaces (APIs).

Schedule data, such as from the user's calendar application.

Explicit annotation created by the user to inform the system of a location (e.g., a "check in" at a baseball stadium) or activity (e.g., marking the time boundaries of a jog to track fitness goals).

Data collection 301 may be run as a constant on-going process, with different techniques appropriate to different sources. Alternatively, data collection 301 may be run periodically at an interval appropriate for the application.

Slicing 302

One challenge with data collection 301 is that multiple sources of observation data may result in a collection of contexts that contain conflicting information. For example, an observation from the user's calendar may place him at a meeting downtown, while GPS observations may show him to be at the beach. Resolving these inconsistencies is key to the interpretation of the data. Slicing 302 is the process of refining the chaotic, multi-threaded collection of raw contexts produced by data collection into consistent segments, called slices, each comprising a set of one or more contexts. For example, in the case of location data such as that from GPS sensors, these slices generally represent either a stay at one place or a process of travel from one place to another. In one embodiment, place information may be refined, in that each stay context defines an area that includes most of the individual points observed during that time. Travel contexts will generally have a start and end point, with some definition of the route between them (e.g., waypoints). In another embodiment, no additional semantic meaning or activity information is added during slicing 302. Other types of data can be used to produce other types of slices, such as slices representing a period of consistent activity. For example, an activity like "shopping" may be represented by a longer-duration slice that overlaps with multiple location slices representing stays at different retail businesses as well as travel between those businesses. Conversely, an activity like "sleeping" may span only part of a stay at home. As another example, a biometric slice such as "high caloric burn" may cover part of a visit to the park as well as time at the gym.

Figure 4:
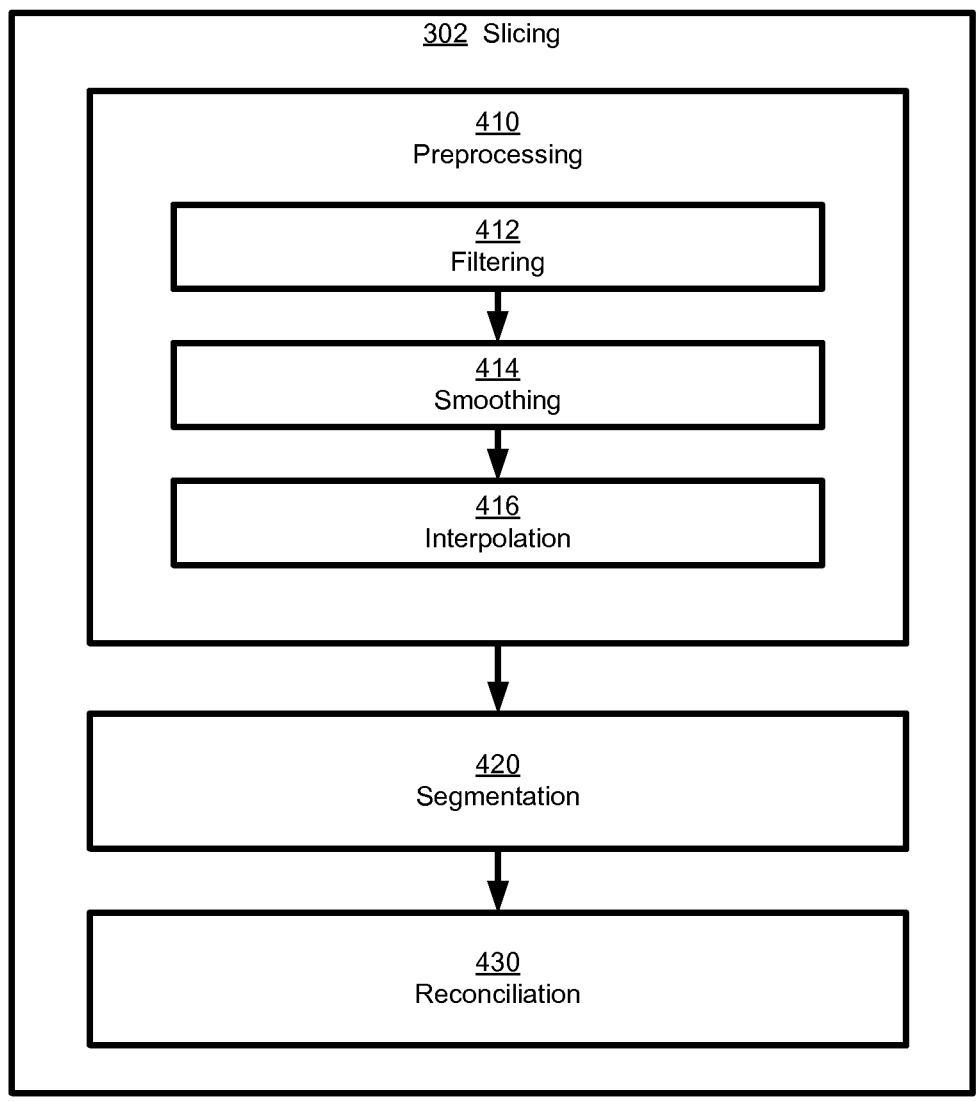
FIG. 4 is a flow chart illustrating a process of slicing in accordance with an embodiment of the invention.

Embodiments of the invention divide the process of slicing 302 into three phases: preprocessing 410, segmentation 420, and reconciliation 430. Each of these phases is described in detail in this section, with reference to the flow chart illustrated in FIG. 4. The steps of FIG. 4 are illustrated from the perspective of the context refiner module 120 performing the method. However, some or all of the steps may be performed by other entities and/or components. In addition, some embodiments may perform the steps in parallel, perform the steps in different orders, or perform different steps.

Preprocessing 410

Since raw context data input into the slicing 302 process come from a variety of sources with varying degrees of inaccuracy, the raw context data are systematically groomed into a suitable form for later steps to minimize the amount of error in the output. In one embodiment, preprocessing 410 involves a combination of filtering 412, smoothing 414, and interpolation 416.

Filtering 412.

Filters on raw context data eliminate from consideration raw context data that are deemed more inaccurate than some desirable threshold. The value of the filter threshold can be sensor-specific, due to different sensor error characteristics. For example, a GPS device's data uncertainty is calculated by physical factors related to the timing of signals received from the device's acquired satellites, so it can report a reliable estimate of sensor inaccuracy. In contrast, reported uncertainty is less reliable with location technology based on cell tower or Wi-Fi triangulation, which lack the measurement precision necessary to account for fluctuations in wireless signal strength, therefore the threshold for filtering 412 those contexts may be higher. When using any location technology, the amount of filtering 412 will depend on its expected error characteristics, and the error characteristics are expected to vary between sources of data. Optionally, default threshold values for filters may be set system-wide, set per sensor type, or based on user preferences. In addition to filtering 412 by location technology, physically unlikely readings (e.g., traveling at higher speeds than possible) may also be filtered.

Smoothing 414.

It is also helpful to later slicing phases for context grooming to smooth sequences of contexts from the same sensor when each individual context is noisy. Noise characteristics are hardware dependent, so the smoothing 414 of each sensor should be parameterized to limit the noise expected from that sensor. For example, a certain accelerometer may generate noisy contexts at a high sampling rate, characterized by large magnitude swings in all axes. One way to smooth such data is to compute an average of the magnitude values over a time window and then output the smoothed magnitude values at a less frequent sampling rate. Smoothing 414 is also used when different sensors conflict. For example, if there is minimal change in values across a series of accelerometer readings, it indicates that a device was immobile, which could contradict a series of location readings that would otherwise suggest the device was wandering due to inaccurate location technology. In general, the degree of smoothing 414 will depend on the variability in data noise from each particular location technology.

Interpolation 416.

Uneven sampling rates can also be due to power conservation, where a device chooses to go into a low-power, low sampling rate state, or is forced to by a governing operating system such as a mobile phone OS. It is common for sensors to be configured to increase sampling when the environment is changing, and to decrease it when the environment (from the sensor's perspective) is static. As slicing 302 occurs over a finite window of time, a decreased sampling rate could lead to relevant context data falling outside the window. Therefore, it is desirable in some cases to interpolate less frequent context data to ensure that the later phases of slicing 302 have sufficient data to analyze. Interpolation 416 generates virtual context data between sensed context data. For example, when there is a gap between two location contexts, a number of interpolated context data points may be generated that correspond to locations between the two endpoints. Interpolation 416 runs into the risk of adding contexts that should not exist. For example, if a sensor is not functional and therefore not reporting, a gap in contexts should not be interpolated. To prevent invalid interpolation 416, sensor data payload may include an indication that there has been an interruption in contexts since the last time a sensor generated context. This may be the default behavior whenever a sensor is (re)started for data collection by the controlling data collection process. In addition, if there is an exceptionally long gap between context data from sensors, it may indicate an interruption even if the sensors fail to set the flag and would be treated as such.

Segmentation 420

Segmentation 420 involves determining distinct, contiguous series of slices from the groomed sensor data representing different activities. For example, the simple day of a user who is an office worker could be segmented into a stay slice located in the morning at her domicile, then a commute to work travel slice, a stay slice at an office, then a commute back home travel slice, followed by a stay slice in the evening at her domicile.

There are a variety of algorithms to segment the input raw context data into stays, travels, and gaps. For example, k-means clustering can be applied to find clusters of contexts (by location, or a distance function combining location and time). Stay slices can be distinguished from travel slices by the dispersion of location context and/or velocity data. Because k-means has fundamental limitations, other more sophisticated clustering algorithms can be used additionally or alternatively to extract slices.

Besides clustering, segmentation 420 can also be performed by applying time-series analysis algorithms, using the variance of a sliding window of input contexts to detect inflection points in the distribution. When the variation across a subsequence of input context data differs from a subsequence before it, the algorithm divides the two subsequences into slices that can then be classified as a stay or travel. For example, a stay is distinguishable from a travel by the low amount of variance in each individual input context in the stay sequence to its centroid, the geographic average location.

Because there are a variety of algorithms that can be applied to segmentation 420, each with different features and limitations, it is also possible to combine their resulting outputs with a meta-segmenter. This meta-segmenter can pick and choose slices output with the highest associated probability among all constituent segmentation algorithms.

Segmentation 420 can also be followed by filter and merge steps that smooth the output slices. Filters can remove short slices with more uncertainty associated with the contexts included therein, e.g., those with few actual sensor observations, and merge adjacent segments that are likely to be the same activity. The thresholds on minimum required observation uncertainty or distance from adjacent segments for filtering and merging can be parameterized to control the false positive rate (groups of raw context data that should not have been segmented) compared to the false negative rate (groups of raw context data that should have been segmented but were not).

Reconciliation 430

In one embodiment, the final phase of slicing 302 deals with resolving newly generated slices with existing contexts generated from a previous slicing 302 run. While this reconciliation 430 is optional—if it were computationally feasible to run slicing 302 on an entire raw context set, the brand new contexts could simply replace the older ones—in some cases reconciliation 430 provides desirable qualities for the purpose of presentation. For example, it is desirable not to change contexts and slices in a user's history that have been previously displayed to the user, unless new data is in significant conflict, because the instability in data shown to the user would appear inconsistent. Instability is even less desirable in cases when the user has performed some operation on a previous context or slice, such as manually labeling or otherwise attaching metadata to it, that the subsequent slicing 302 run would overwrite. As such, there are rules governing when new slices and contexts can replace preexisting data in a user's history.

One way to limit the scope of changes between new and preexisting slices is to specify a time window within which preexisting data may be changed or replaced. Any data outside the window (i.e., older than a certain age), would be left unchanged in later slicing 302 runs. Contexts from newer slices are then integrated into the eligible preexisting slices by comparing type (stay or travel) and time spans. If a new slice is of the same type and begins and ends at approximately the same time as an existing slice, it could retain the same metadata of the existing slice, including any identifier labels (ids) and contexts. When a new slice and old slice overlap in time but conflict in type, the process can prefer the new slice except when there has been manual intervention, for example when a user has already interacted with the existing slice or confirmed it in some way using a user interface. Finally, the last slice is most likely to have changed due to new data, and could have its ending time extended if it aligns with a new slice starting at a time near its own start time, or completely replaced if the type changed (if a previously presumed stay were actually the beginning of a travel slice, for instance).

Labeling 303

Labeling 303 is the process of adding more specific and semantically meaningful data to the slices produced by slicing 302. In one embodiment, some or all of these labels are themselves contexts associated with the slices. In particular, labeling 303 adds geography (such as a slice's city or neighborhood), venue (public places, businesses, or personally significant places like "home"), and activity (such as "working", "eating", or "going to see a movie"). Note that the process of labeling 303 may suggest a revision in slicing 302, such as when the labeling 303 process determines that a user was eating and then seeing a movie at the theater next door, while the slicing 302 phase represented both activities as a single slice, prompting the single slice to be split into two successive slices, taking place at distinct venues.

A slice can be labeled using identifiers from predefined data sets, such as public venue records, or automatically generated, for example using a reverse geocoding system that converts latitude and longitude coordinates into an approximate street address. The labeling 303 process uses these data sources to apply probable labels to each slice. Some labels are exclusive while others may coexist alongside one another. Example data sources for the labeling 303 process include:

Public venue database—a set of geographically annotated public venue names, such as businesses, public spaces, or landmarks. The venue data should be able to be queried geographically (e.g., to find likely venues within some specified distance of the slice's observed location observations), therefore it should have a location represented either as a single point (latitude, longitude, altitude) or as a set of points that defines or approximates its shape. The venue may also contain a unique identifier, which is useful, for example, to use to associate the venue with manually entered observations from the user. In addition to location and name, the data entry for the venue may contain other metadata such as address, business hours, categories describing the type of venue, and reviews useful to present back to the user. Because the set of public venues changes over time, this database may be configured to receive updates whenever available.

User-specified database of places—a set of manually or automatically generated locations considered private to the user, identified by location and optionally by name and other metadata the user chooses to attach. The purpose of this database is to provide labels for slices that cannot be associated with public venues due to gaps in coverage. For example, many homes are not public venues and therefore would not be found in any public venue database, so a user may need to manually label his/her home. Labels such as "home" and "work" can also be automatically inferred.

A set of additional labels associated with certain venue metadata such as a venue category. These labels could include descriptions of activities commonly applicable to the venue category (e.g., "jogging" at public parks or "dining out" at restaurants). These labels may be either predefined or automatically extracted, e.g., by analyzing the texts of some corpora such as online reviews. As with venue or place, the user can manually apply an activity label to a slice, or the labeling 303 process can infer it based on a model of likelihood given the input context.

Public and user-specific calendar data—listings of public events and private appointments that can then be applied to matching, consistent slices.

A database to store user corrections to automatically applied labels that were made by the system in error. This database has multiple uses. First, in the case of continuous slicing 302 and labeling 303, the correct label can be used during reconciliation 430 to prevent incorrect labels from being reapplied. Second, the presence of the correction indicates with high confidence what the correct description for the slice is, and can influence future automated labeling 303 decisions for similar slices. The user corrections may be stored, for example, in contextual history storage 130 or similar data store accessible by the context refiner module 120.

Figure 5:
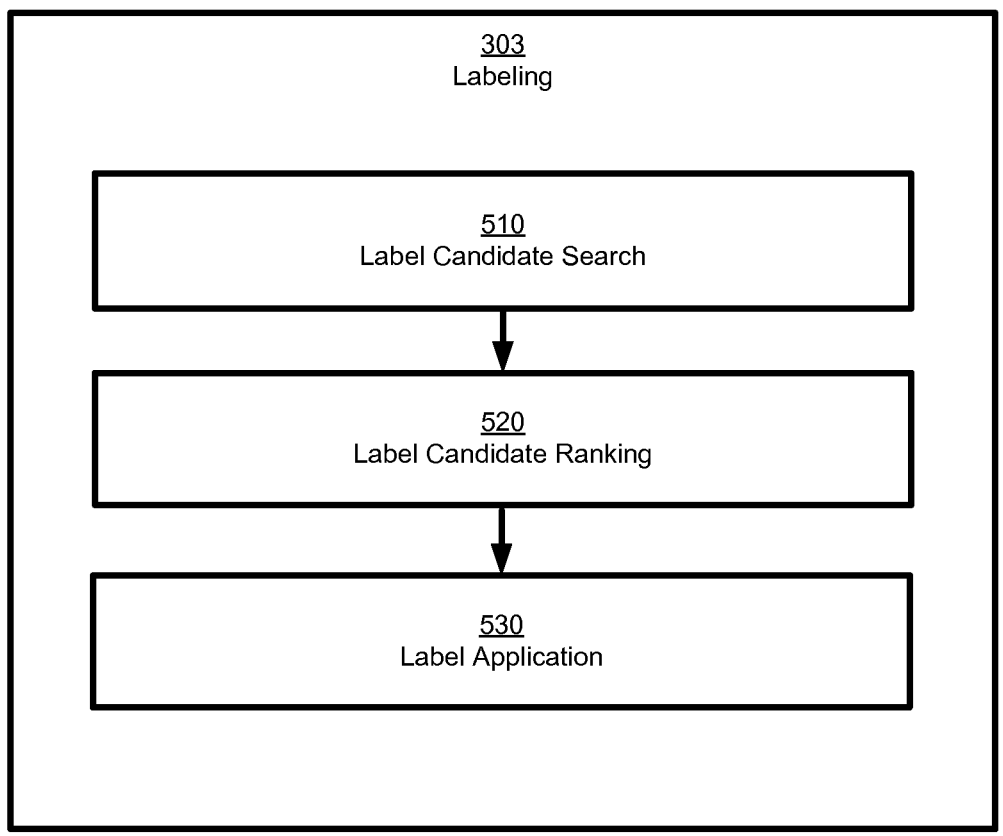
FIG. 5 is a flow chart illustrating a process of labeling in accordance with an embodiment of the invention.

Conceptually, it is possible to view the labeling 303 process as a collection of subprocesses responsible for outputting one type of label at a time. Labels of different types can then be run simultaneously on slices, or chained when one type of label is triggered by the presence of another (i.e., activities that are category- or venue-specific are only considered when a preceding labeling 303 subprocess applies a corresponding category or venue label, respectively, to the slice). In general, the labeling 303 process can be broken into three phases: label candidate search 510, label candidate ranking 520, and label application 530, as illustrated in FIG. 5.

Label Candidate Search 510

In the label candidate search 510 phase, the label sources are first queried to discover possible labels based on the slice's existing contexts. The following provides examples of how various label types can be searched.

Venues and places are found based on the slice's location, which by definition is a consistent estimate of a user's location over a period of time. However, there is a degree of uncertainty when using the associated slice location. Essentially, raw sensors providing locations are imprecise. The label candidate search 510 phase does not rely on the exact location represented by the slice, but instead expands the search within some radius calculated as an estimate of the uncertainty. For example, if a slice's location was calculated using Wi-Fi triangulation, the triangulation error is often in the tens to low hundreds of meters, so the search process may query for venues and places centered at the slice location within two hundred meters.

Events and appointments can be found based on the slice's location and time boundaries. An event at a venue would be matched against the overlapping time boundaries between the event and the slice. Appointments are also matched against location and time. Because event and appointment time boundaries are imprecise, and slice time boundaries may be imperfect, the slice's time boundaries do not need to exactly match those of an event or appointment. Similarly, the slice location does not need to be an exact match either. The label candidate search 510 finds possible events and appointments within the likely uncertainty radius of the slice location.

Several methods may also be used to find candidate activities. For example, based on the category and/or venue labels already applied to the slice, the label candidate search 510 process can bring up associated activity labels. As another example, the slice context can be compared to similar slices in the past if the user had previously labeled activities manually. For example, if a user previously labeled an activity at the same venue or a venue in the same category as the slice that has not yet been labeled with an activity, that activity would be considered as a candidate for labeling the slice.

Label Candidate Ranking 520

Once a set of label candidates of a given type are found, the likelihood of each one given the contexts already associated with the slice is evaluated. In one embodiment, the likelihood of each label is computed and the labels are ranked. There may also be a threshold for likelihoods, such that if no label is deemed likely enough, none is applied to the slice at all—this avoids the case of having a label (e.g., an incomplete label) applied inappropriately. In one implementation, slices are constrained to only having one label of some types (e.g., venue labels), and the top-ranked label meeting the minimum likelihood threshold is applied to the slice. For other label types, multiple labels can be valid for a single slice, and all labels meeting the minimum threshold of likeliness are applied.

Likelihoods are calculated by scoring a candidate label given the contexts already associated with a slice. A model is defined to be an algorithm for computing likelihoods given slice context. Models treat the various aspects of a slice context as features. Some example features include:

Slice location—while the label candidate search 510 also uses location to discover the set of eligible labels to apply, a ranking model can further determine the likelihood of a label given its distance to the slice location, or relative likelihood between several candidates (e.g., a venue that is significantly farther from the slice location would to considered less likely, but two venues that differ only a small amount in distance from the slice location may be considered equally likely given the location context, all else being equal).

The particular user whose slice is being labeled—since users have individual differences, a model may use specific algorithms tailored to each to achieve the best labeling accuracy. One example of how an individual user could affect label candidate ranking 520 is for the ranking process to use the user's accumulated history of slices and labels, some of which the user may have explicitly confirmed to be accurate. Labels that occurred more often in the user's history may be considered more likely when labeling new contexts.

The beginning and end stay times—since different labels are more likely to occur at different times (e.g., restaurants at meal times, rock concerts in the evenings), and events, appointments and activities last for different lengths of time (e.g., movies between 1.5-3 hours), the likelihood of a particular label can depend on the corresponding day and time range.

Besides the context provided by the slice, models can use other sources of information to inform the likelihood estimate. Some example information sources include:

Venue hours of operation—can be used to reduce the likelihood that a venue be applied to a slice when the venue is known to be closed during some significant portion of the slice's time boundaries.

Venue popularity—e.g., relative popularity over all time compared to other venues, or historic popularity at the time of day, day of week, etc., which can indicate the likelihood that the label is applicable given the slice's time boundaries. If the duration of the slice is known, it can also be compared to the distribution of stay durations at the venue to determine whether the length of time spent in one place is consistent with other visits to the candidate venue.

Category popularity—can be used when data is scarce about specific venues in the candidate list. This can also be relative to time of day, day of week, etc., and can also include typical stay durations so that the slice's time boundaries factor into the likelihood calculation.

Routine—considering how often in the past the user has similar slices with the candidate label, can determine whether a certain label is more likely (if there are many such instances) or less likely (if there are few or no instances). Routine is not limited to only considering a specific user's historical patterns. Users can be clustered into cohort groups, or even aggregated into a global routine model, depending on data scarcity due to limited interactions with the system or the area where the slice occurs. Methods for determining a user's routine are discussed in greater detail below, with reference to FIG. 6.

Social interest—some users are more likely to visit a venue if their friends recommended it, if they have been there before, or were labeled as being there during an overlapping time period by the labeling 303 process. Some of this information is available through existing social network APIs, for example recommendations may be based off of a friend "liking" the venue on FACEBOOK. Information about a user's friends visits to a venue can also come from a friend "checking in" or retrieved from the contextual history storage 130 (in embodiments where the contextual history storage is centralized).

Label Application 530

One or more models can be run to process a slice's context(s) into labels, which are applied in label application 530. Conceptually, multiple models can be represented by a single meta-model that runs the appropriate features through its composing models. Once the meta-model outputs probabilities, labels deemed sufficiently likely are applied to the slice. In one embodiment, labels that are not deemed to be sufficiently likely can still be surfaced as options to the user should he/she wish to alter the label set by adding new labels, with the label candidate ranking 520 intact. In such cases, it is not necessary for the same meta-model to produce the label candidate ranking 520—different meta-models can rank labels differently to produce whatever is specified by the system design of a particular embodiment.

In one embodiment, automatic label application 530 does not require that every label is ranked solely by likelihood. For example, when users interact with the label candidates (e.g., to manually apply labels), it can be desirable to present candidate labels in different orders to make finding desired labels easier. For example, an alphabetical order or a hybrid order that incorporates both likelihoods and lexicographical positions can be used. Once labels are applied to slices, the additional contextual data is presentable to the user and available for further processing in a variety of forms.

Building Recommendation Agents

A user's history can be used to build a recommendation agent that is customized for the user. Additional data about the user and/or the items that are considered for recommendation can also be used in building the recommendation agent. In various embodiments, the recommendation agent module 140 models the user's routine and/or personality in order to build a customized recommendation agent. In some embodiments, the recommendation agent module 140 also updates the customized recommendation agent based on feedback provided by the user after the agent has begun to be used.

Figure 6:
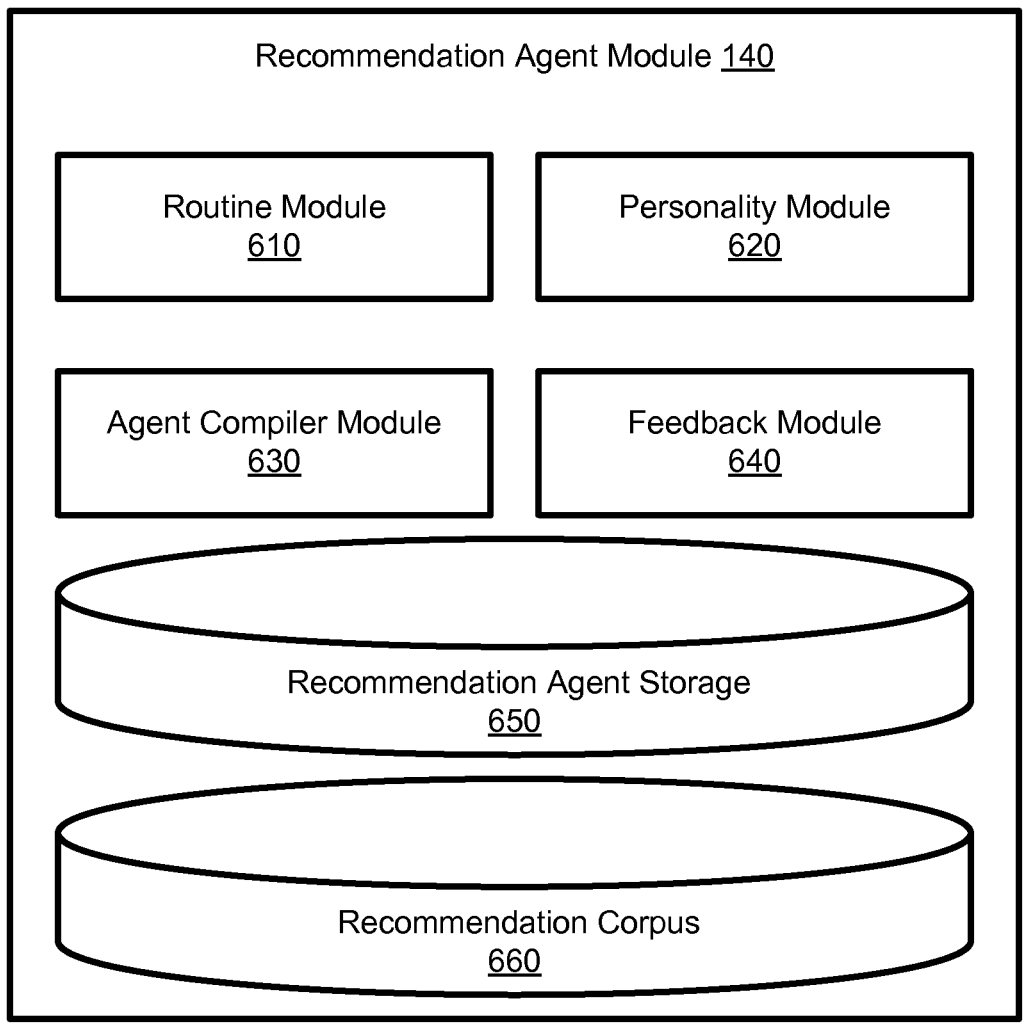
FIG. 6 is a block diagram illustrating one embodiment of the recommendation agent module shown in FIG. 1.

FIG. 6 is a block diagram illustrating one embodiment of a recommendation agent module 140. The illustrated recommendation agent module 140 includes a routine module 610, a personality module 620, an agent compiler module 630, a feedback module 640, recommendation agent storage 650, and a recommendation corpus 660. In other embodiments, the recommendation agent module 140 contains different and/or additional elements. In addition, the functions may be distributed among the elements in a different manner than described herein.

The routine module 610 and personality module 620 generate models of a user's routine and personality respectively, based on the corresponding user history stored in contextual history storage 130. The agent compiler module 630 builds a customized recommendation agent for the user based on the routine model, the personality model, and/or additional information about the user that is available to the recommendation agent module 140. The customized recommendation agent is stored in the recommendation agent storage 650. The feedback module 640 gathers feedback during use of the customized recommendation agent and updates the agent based on the gathered feedback. The recommendation corpus 660 comprises a plurality of possible recommendations and corresponding metadata (e.g., a type of recommendation, times when the recommendation is appropriate, types of personality that are likely to respond positively to the recommendation, and the like).

The recommendations in the recommendation corpus 660 can be compiled from various existing sources and/or generated by the recommendation agent module 140. For example, FOURSQUARE provides a publicly accessible database of venues and events that may be included as part of the recommendation corpus 660. As another example, the recommendation agent module 140 may maintain a list of activities (e.g., going for a walk, eating ice-cream, etc.) and add activities to the list if a user tags a slice with a previously unknown activity. In some embodiments, the same data sources that are used for labeling (as described above with reference to FIG. 3) are used to populate the recommendation corpus 660. In one embodiment, recommendations are compiled in an ongoing way as new recommendations become available (e.g., new restaurants open, events are scheduled, books are published, etc.) and added to the recommendation corpus 660 for later delivery to the user or group of similar users. In another embodiment, just-in-time recommendations are generated in real-time for a user based on the user's current context. For instance, when the user is in a new area of the city, the recommendation agent module 140 searches existing databases for possible recommendations in the area and the user's personality and routine data are used to determine appropriate recommendations (e.g., a nearby and highly rated restaurant for dinner).

Modeling User Routine

The routine module 610 takes a user's history comprising slices as input and generates a model describing the user's routine. The routine model describes correlations between contexts for the user that can be used to generate recommendations based on the user's current contexts. For example, if a user regularly leaves work to purchase lunch at midday, the routine model could indicate a correlation between the contexts "midday" and "eating." Thus, a recommendation system using the routine model might recommend restaurants in the user's vicinity at around midday, even if the user is not at work that day.

The routine module 610 processes the slices in the user's history to create a collection of transitions. A transition is defined as a change from one context to another. A transition has a source (the starting context) and a destination (the following context). Like contexts, transitions can have varying degrees of specificity, semantic content, and likelihood. For example, a user's night out could be described by any (or all) of the following transitions: dinner followed by a movie, Joe's Pizza followed by Regal Theaters, the Capitol Hill neighborhood followed by the University neighborhood. The routine module 610 can therefore record many possible transitions (with associated probabilities) to account for a segment of observed behavior. Thus, the series of contexts included in the slices of a user's history also define a collection of transitions.

Embodiments of the invention use the following process to build a routine model for a user based on that user's sequence of historical slices.

Split the slice sequence into subsequences whenever adjacent slices are too far apart in time (e.g., greater than three hours).

Filter out any slice not meeting certain quality criteria. For example, by filtering out stays of duration less than five minutes, stays supported by too few observations, and/or stays with low probability.

Iterate through the slices. Create transition pairs between contexts for the current slice and contexts from a previous slice within some history window (a larger window allows a wider range of data, but can be much more expensive to compute as many more transition pairs become possible). The context from the previous slice is the source of the transition, and the context from the current slice is the destination.

Keep count of how often each context and each transition pair occurs over time. Using these counts, compute the probability of each destination given each source, i.e., the probability of various transitions.

Create and store transition rules for the user, each transition rule comprising a source context, a destination context, and a corresponding probability that the user will make a transition from the source to the destination.

The result of this process is an incrementally-updated routine model for the user consisting of a collection of transition rules, each with a source context, a destination context, and a probability. For example, imagine a segment of a user's history that involves three slices: a stay at a coffee shop in Bellevue, travel from Bellevue to Seattle, and a stay at the user's workplace in Seattle. The first slice might include contexts like "location=Bellevue", "venue=Joe's Café", "type=coffee shop", and "time=morning". The second might include "location=Bellevue to Seattle" and "activity=driving". The third might include "activity=working", "location=Seattle", and "location=456 Spring St." The routine module 610 can generate a number of transitions from this data and add them to the user's routine model. Examples include a transition from "time=morning" to "activity=working", a transition from "type=coffee shop" to "activity=driving", a transition from "location=Bellevue" to "location=Seattle", and a transition from "location=Bellevue" to "location=456 Spring St." Note that, because the system is less certain that the third slice was at 456 Spring St. than that it was in Seattle (because Seattle is larger and easier to identify than a specific address), the "456 Spring St." transition would have lower probability than the "Seattle" one.

Furthermore, the location module 111 might have been uncertain whether the user was at Joe's Café or Barbara's Bagels next door (e.g., due to the noise in position data), assigning a higher probability to Joe's. In one embodiment, transitions for both Joe's and Barbara's are generated and added to the routine model, with the corresponding probability for Joe's being higher than that for Barbara's. In other embodiments, the routine module 410 considers only the most likely interpretation of the data, only transitions that exceed a threshold probability. In further embodiments, contexts are filtered according to combinations of these approaches.

For simplicity, the source of a transition rule has been described above as a single context. However, transitions rules can have sets of contexts as sources, allowing non-Markovian transition rules. For example, a rule could encode that when a user goes to the Capitol Hill neighborhood followed by the University District neighborhood, the user then has a high probability of visiting the Fremont neighborhood. The source in this example consists of a sequence of two contexts, for the two neighborhoods.

In one embodiment, the recommendation agent module 140 represents users' general preferences using transition rules. For example, a general love of antique shops is represented by a transition rule where the source is the null context (i.e., anywhere, anytime) and the destination is the antique shop category. Thus, the recommendation agent module 140 can manage a user's general preferences by including such transition rules in the user's routine model, and these preferences will both generate recommendations (just as for other rules) and modify the weights assigned to generated recommendations.

In one embodiment, the routine module 610 stores the routine model in recommendation agent storage 650 for future further processing. In another embodiment, the routine model is passed to the agent compiler module 630 and used to complete the building of a recommendation agent in combination with additional factors (e.g., a personality model, as described below). In this case, the routine model may not be independently saved to any form of long term storage at all.

Modeling User Personality

The personality module 620 takes a user history comprising slices as input and generates a model describing the user's personality. The goal of the user personality model is to provide a better understanding of the user in general terms (rather than tracking specific preferences) and use that to guide the recommendation process. Much research has been done on the problem of categorizing, detecting, and understanding personality types. Examples include Jung's "Psychological Types", the Myers-Briggs Type Indicator derived from it, Enneagrams, and others. The aim of these approaches is to provide a system for exhaustively describing personality types along with a method to determine a person's type, typically based on an interview or survey. Similarly, embodiments of the personality module 620 use plurality of personality traits (dimensions) and determine an estimate for the user's affinity with that trait. In one such embodiment, this process is automated (requiring no human interpretation), and nonintrusive (e.g., avoiding explicit survey questions).

A specific representation of user personality and method of characterization that is well-suited to use by the personality module 620 is described below. However, the techniques described below are equally applicable to other personality representations, such as those mentioned above or others that may be devised.

The context refiner module 120 outputs slices indicating historical contexts associated with a user. The personality module 620 processes the slices and recommends other places, businesses, or events to the user based on the user's historical contexts. In one example, the personality module 620 builds a personality model for the user that indicates the user's affinity with various personality traits, and the system makes recommendations based on the user's personality traits indicating high likelihood of interest in the recommended item. For example, if the user's personality model indicates an affinity for outdoor activities, the model built by the personality module 620 may cause the system to recommend a nearby park, even if the user has not previously been observed visiting parks.

The personality module 620 represents each personality trait as a position on a personality dimension, ranging from not exhibiting the trait in question at all, to completely exhibiting the trait at all times, with most people falling somewhere in the middle. Thus, a given user will be evaluated as having a score (e.g., from 0% to 100%) for each dimension.

In one embodiment, the following dimensions are used:

Desire for novelty: how often the user chooses to try new, unfamiliar experiences as opposed to sticking with the tried and true. For example, a person with a high novelty preference will often try new restaurants in an area, even if they might not be as good as a nearby familiar favorite.

Extravagance: how often the person is willing to indulge in expensive products or experiences.

Preference for proximity: to what extent the person prefers spending time near to home or other frequently-visited places like his workplace, rather than traveling long distances. Proximity can alternatively be stated as its inverse, willingness to travel.

Love of the outdoors: how often the person prefers outdoor activities when available.

Preference for physical activity: how much the user prefers physically active as opposed to sedentary activities.

Desire for solitude: how often the person prefers solitary activities as opposed to social ones.

In other embodiments, the personality module 620 uses different and/or additional personality dimensions. Any aspect of personality can be used in the personality model, as long as (1) it is known how to test for that trait in people (e.g. using survey questions); and (2) it is known how to map the trait to useful features in an application of the system. The exemplary embodiment described uses only personality traits closely related to the task of recommending places to go, but other types of traits can be used. For example, in one embodiment, Myers-Briggs traits are used to learn where users stand on dimensions including extroversion/introversion and thinking/feeling. Another embodiment learns personality traits including tastes in books, movies, and other entertainment and thus is able to determine correlations between activities that are not obviously linked. For example, one such personality model can predict whether a person who likes a certain type of movie will enjoy going to a certain restaurant.

As with other personality approaches (e.g., Myers-Briggs), the example personality dimensions described above can be determined for a person by asking them to answer a questionnaire. Such questionnaires typically pose binary choices such as "would you rather visit a library or a bar?" By asking many of these questions, general tendencies can be determined such as 'desire for solitude' or 'love of the outdoors.' However, in order to determine users' personality traits without having to administer an intrusive and tedious questionnaire, embodiments analyze the behavior data collected by the system to automatically determine the personality traits.

In one embodiment, the personality module 620 is initialized using a baseline user group. Thus, when the system is used by an end user, it has already been trained and can immediately provide meaningful recommendations. In one embodiment, the following general algorithm is used to initialize the personality module 620:

Recruit a baseline user group.

Administer a personality questionnaire to each member of the baseline user group, thus determining their personality dimensions.

Record behavior data for the baseline user group as they go about their everyday lives (e.g., using the system described herein) and encode the collected behavior data as a set of features.

Encode the collected data as a series of classification problems, where each member of the baseline group is a data point, the corresponding behavior data are the features, and each member's place on a personality dimension is the classification to be learned.

Use machine learning algorithms to develop a model that can predict the position in each personality dimension of any given user based on the behavior data of that user.

The above generalized algorithm can be realized in a number of ways. One embodiment is described herein as an illustration. AMAZON's "Mechanical Turk" product is a way to recruit and pay users. A task is created in Mechanical Turk that asks users for (1) authorization to their FOURSQUARE data; and (2) answers to a number of binary-choice personality questions.

FOURSQUARE is a service that encourages users to "check in" to places they visit. Users can see other users' tips about those places, receive special deals from businesses they check in to, and earn "badges" for checking into various kinds of places. FOURSQUARE provides an approximation of the user's behavior. Thus, FOURSQUARE provides a good source of data to use as some or all of the baseline group behavior data. While such behavioral data is not as complete as information collected by the system described herein, since users do not check in everywhere they go and do not indicate how long they stayed, it allows the collection of behavior data from many existing users without having to recruit people to use a new application for days or weeks.

The personality questionnaire given to the baseline user group comprises binary-choice questions, as described above, which pose a number of choices intended to elicit information about the user's preferences. By asking enough questions (e.g., 20 questions, but more or fewer may be asked), it can be determined where the user stands on the personality dimensions to be used. The Foursquare history of each baseline user group member can be used to personalize the questions asked—the corresponding FOURSQUARE histories reveal the city each member lives in, the neighborhoods they spend time in, and specific places they have been. Thus, the questions posed to each member can relate to real places around the member, and be tailored to test traits such as novelty and proximity that are dependent on the member's behavior over a period of time. For example, determining a member's affinity for novelty requires not just knowledge that the member has visited a particular restaurant, but also whether the user has previously visited that restaurant. Other traits can determined based on general data about places visited by the member. For example, the member's affinity for outdoor activities can be influenced by identifying a visit to a park, regardless of past behavior.

Once behavior data and personality data from the baseline user group has been collected, it is encoded to be fed to a learning algorithm. Each member's behavior is represented as a series of visits, each identifying features of the visit that are relevant to the personality traits that the system is attempting to learn. For example, in the embodiment currently being described, each visit to a place is encoded by the following features:

Category. E.g., restaurant, Chinese restaurant, park, office, and the like. Note that places may have multiple classifications, and that the categories are hierarchical—multiple categories are encoded, and include the "ancestor" categories as well (e.g. "restaurant" is an ancestor of "Chinese restaurant").

Distance. Based on the member's history, one or more "home areas" are identified where the member spends a great deal of time. Typically, these would represent home and work neighborhoods. For each place, the distance to the nearest home area is computed. Also, the distance from the previous place in the history is recorded, if they are close enough in time (to track how far the member is willing to travel from place to place).

Familiarity. How often the member has been there before.

Price range. Many local data sites (such as YELP, or CITY-SEARCH) already encode this data, for example on a scale from 1 to 4.

Once the visits are encoded, summary statistics about the corresponding features can be computed for each member of the baseline group. Most members' data will be dominated by the time they spend at home and work, so counting these visits could confuse some personality traits. For example, if one counts home and work, most people will probably be seen to visit familiar locations most of the time. Thus, by identifying these special places and excluding them from certain statistics (or giving them reduced weighting), visits to such places are prevented from dominating the analysis. In one embodiment, the computed statistics include:

Category frequency. For each category, how often the member goes there. Home is excluded.

Distance. Median, mode, mean, and standard deviation of distance from visited places to the nearest home area are included as well as distance to the previous place, if applicable. Home and work are excluded.

Familiarity. Median, mode, mean, and standard deviation of the number of previous visits are computed. Home and work are excluded.

Price. Median, mode, mean, and standard deviation of price for places that have price information are computed, excluding home and work.

Home. The proportion of home visits to total visits, and average number of home visits per day are computed.

Work. As with home, proportion of work visits and average work visits per day are computed.

Note that in this embodiment, no explicit features pertain to outdoors, solitude, or activity; these features are inferred from the place categories. Rather than trying to hand-code a mapping from categories to these traits, the learning algorithm discovers them.

Once each member is encoded as a set of features and a set of personality classifications has been determined, standard machine learning algorithms can be applied to learn a model that predicts the latter from the former. Each personality dimension is treated as an independent class to be learned. The result of this process is a predictive model for each personality dimension; the models take the above computed statistics as input and output estimates of a user's affinity with each personality trait. Thus, the personality module 620 has been initialized using the baseline user group. Once the personality module 620 has been initialized, an end user's history can be used to predict the user's personality, without the need for the end user to explicitly provide data. For example, by feeding the history of the end user into the personality module 620, the above statistics can be computed and the predictive model used to generate a personality model for the end user, without requiring the end user to complete a survey, or actively provide personality data in any other manner.

In one embodiment, the personality module 620 stores the personality model in recommendation agent storage 650 for future further processing. In another embodiment, the personality model is passed to the agent compiler module 630 and used to complete the building of a recommendation agent in combination with additional factors (e.g., a routine model, as described above). In this case, the personality model may not be independently saved to any form of long term storage at all.

The recommendation agent module 140 can use the user's personality model to improve recommendations in many ways, including, but not limited to:

Suggesting social events and venues to people with a low "solitude" score.

Recommending familiar places to people with a low "novelty" score when they have not been to the place in a while or when the place is having some kind of special event or offer.

Make more recommendations (and present them more aggressively) to people with a higher "novelty" score.

Make a whole sequence of related recommendations (e.g., dinner, a walk, and a movie) in an interesting neighborhood to people with a low "proximity" score.

Give social rationales (e.g., "your friends like it") more weight when making recommendations to people with a low "solitude" score.

Balance social events with solitary recommendations (e.g., "why not take a walk in the park after this party?") for people with a high "solitude" score.

When recommending a new place to people with a low "novelty" score, provide rationales that refer to familiar experiences (e.g., "this restaurant is owned by the same people as [this other place] you visit often").

For people with a low "extravagance" score, balance extravagant recommendations with ways to save money (e.g., "this expensive restaurant is offering a Tuesday dinner special").

As described previously, general preferences can be incorporated into the user's routine model by creating transition rules with the null source. Similarly, personality traits can be represented by a transition rule with a null source. For example, a preference for solitary activities can be represented by a transition from the null source to a "solitary" context. Venues and events can be associated with particular personality traits (e.g., an expensive downtown restaurant can be tagged as extravagant), and these associations with traits become additional venue attributes that can be used when generating and weighting recommendations for a user. In one embodiment, some traits, such as extravagance and outdoors are computed from available venue metadata, and are thus the same for all users. Other traits, like novelty and proximity are determined from information about the user's history and location (e.g., a venue is considered novel if the user's history does not include a previous visit to the venue) and can thus differ from user to user. In other embodiments, these attributes are determined for venues and events in various other and/or additional ways.

Compiling Recommendation Agents

The agent compiler module 630 builds a customized recommendation agent for an end user that takes the end user's current context(s) as input and outputs customized recommendations. In various embodiments, the recommendation agent is based on the end user's routine model, personality model, and/or additional data describing the end user and his/her interests.

At a high level, an agent is simply a system capable of adapting itself to a particular user's preferences and needs. This definition refers to how the system is presented to the user and is not intended to imply how the agent is implemented. For example, a monolithic system may compute recommendations for all users simultaneously, while the visible user interface presents those recommendations as coming from the user's agent. In one embodiment, a customized recommendation agent is a file that is generated by the agent compiler module 630 at a recommendation service provider server and transferred (e.g., via the internet) to the end user's mobile device, where it is used by a recommendation application to provide customized recommendations. In other embodiments, the agent compiler module 630 executes on the end user's mobile device using data from local storage and/or accessed remotely via a network.

Updating Recommendation Agents

One limitation of many recommendation systems is that they have trouble determining when a particular observation should or should not influence the general model of a user's preferences. For example, a user may be observed to visit a fast food restaurant every day for lunch. However, in general, he dislikes fast food and only goes there for lunch because it is fast and cheap. For a recommendation system with no concept of context or routine, these visits will lead to the system recommending fast food at other times, when they would be undesirable. The system described herein addresses this issue by learning that fast food visits happen only in a certain context: when the user is at work, and when the user takes a short lunch. Thus, the system is far less likely to recommend fast food at other times. Note, however, that it is too simple to say the user "does not like fast food"; in fact, the user is willing to eat fast food in certain circumstances, and the system has learned this. There may be some situation in the future in which the user needs a quick, cheap meal, and the system will be able to suggest a fast food restaurant.

In order to address this, the feedback module 640 collects feedback regarding recommendations from the end user and uses that feedback to update the end user's recommendation agent. A variety of feedback can be collected from end users in order to improve the models used by the recommendation agent and/or directly improve the recommendation agent itself. At a high level, feedback can be categorized as either explicit or implicit.

Explicit feedback is any information deliberately provided by the end users about their preferences or the quality of a recommendation. In various embodiments, several forms of explicit feedback are collected and used to improve the recommendation agents.

First, end users can explicitly express a preference in favor of venues and events anywhere they see them in the recommendation system's user interface (UI), for example by selecting a button associated with the venue or event in the UI. This includes at the time the recommendation is initially offered. Naturally, the feedback module 640 can use this information directly, for example by favoring recommendation of a previously liked venue in an appropriate context. Alternatively or additionally, the feedback module 640 can extract attributes of the venue (such as category of business, neighborhood, price range, and other features) and use them to increase the likelihood that the recommendation agent of the end user will recommend items with such attributes in future. Furthermore, the feedback module 640 can determine how the venue aligns with the end user's personality traits (for example, whether it is social, extravagant, and so on) and adjust the weights of those traits in the end user's personality model accordingly.

Second, end users can explicitly accept or reject the reasons associated with recommendations. Reasons describe the system's justifications for recommending something, and can be determined by venue attributes (e.g., it's popular or highly rated, it's from a category you've enjoyed in the past, etc.), by context (e.g., it's nearby), or by personality traits (e.g., it's social). Reasons also reflect the routine contexts used to generate the recommendation. For example, if a recommendation was generated because of past behavior in the same neighborhood, at the same time of day, or following the same type of venue, these would all appear as reasons ("you usually go out for coffee when you're in this neighborhood"). By liking or rejecting these reasons for a recommendation, end users tell the system to give more or less weight to similar future recommendations or to those routine contexts. Thus, the feedback module 640 adjusts the weights of those factors accordingly. In the above example of the end user who often goes to fast food restaurants, though he does not really like them, the end user might be offered a couple of reasons for a fast food recommendation: "You often go out for fast food" and "You often go here from work". If the user rejects the former and accepts the latter, indicating to the system that, while this recommendation might be appropriate for this context, it does not reflect a general category preference, the feedback module 640 adjusts the user's recommendation agent correspondingly, and thus, fast food recommendations are less likely to be made outside of the "work" context in future.

Third, end users can reject recommendations, requesting that the venue or event not be shown again. In some embodiments, the feedback module 640 uses this information to adjust the weights of the venue, of other venues with similar attributes, and of corresponding personality traits. In this case, the weights are adjusted to reduce the probability of similar recommendations in the future. In one such embodiment, a penalty is also applied against all of the reasons associated with the rejected recommendation, reducing the weights of those routine contexts or other factors. For example, the above mentioned fast-food-eating user could simply reject any fast food recommendation, which would result in a general penalty for that category of venue. In other embodiments, the feedback module 640 responds to rejection of a recommendation by adding the recommended venue to a blacklist, thereby ensuring the same recommendation is guaranteed to not be made in future.

Fourth, users can answer questions about their preferences and experiences. The feedback module 640 can create questions that probe user preferences in various ways. One example is a "this or that" question, which asks users to choose between two possible venues. The venues are chosen as examples of opposing preferences (e.g. extravagant vs. thrifty, solitary vs. social, Chinese vs. Mexican food), and each question answered provides a small piece of evidence regarding the user's preferences. Other questions include asking whether the user enjoyed a past experience that has been observed by the system (e.g., "how was your experience at Joe's Bar yesterday?"—this can be treated similarly to receiving explicit feedback in other ways for that venue), asking them to choose between two activities (e.g. dinner and a movie vs. drinks and dancing), and other personality questions as described above.

Implicit feedback is any information collected about the user's preferences based on actions the user takes for other purposes. In various embodiments, several forms of implicit feedback are used to refine the recommendation agents.

First, if the user follows a recommendation when it is made, this can be interpreted as a very strong endorsement of the recommendation's suitability for the user in the user's current context. Correspondingly, in one embodiment, the feedback module 640 reinforces the attributes of the venue and personality traits used to select the recommendation. Additionally, by following the recommendation, the user has implicitly provided evidence that this particular moment in the user's routine is one when the user is open to suggestions. For example, if the recommendation was made on a Friday evening, the system might make more Friday recommendations in the future.

Second, when users receive recommendations, they can add the venue or event to their "plans", a collection of places they intend to go to in the future. While not as strong as actually following the recommendation, this is a strong signal that the recommendation was a good one and that the user found value in receiving it, though it may not be appropriate for that particular moment (and the corresponding contexts). Correspondingly, in one embodiment, the feedback module 640 reinforces the attributes of the venue and personality traits used to select the recommendation, but by a lesser amount than if the user followed the recommendation.

Third, whether or not users add recommendations to their plans, they may eventually go to that venue or event. Again, this provides evidence that the recommendation was a good one for that user, though the user may be going to the venue for reasons other than those that led the system to recommend it. Correspondingly, in one embodiment, the feedback module 640 reinforces the attributes of the venue and personality traits used to select the recommendation, but by a lesser amount than if the user followed the recommendation or added the recommendation to the user's plans.

In some embodiments, the feedback module 640 incorporates feedback that indicates a user's preferences or affinity for a particular type of recommendation by adding null-source transition rules to the model or models used by the recommendation agent. The feedback module 640 weights updates determined from user feedback relative to updates from observed slices. For example, if the user visits a coffee shop, the "null to coffee shop" rule is updated in the model to make future recommendations of that coffee shop, and of coffee shops in general more likely. If the user then provides explicit positive feedback for that coffee shop, the system may count the feedback as equal to a visit or worth more or less weight than the visit itself. In one such embodiment, explicit feedback is weighted to be equivalent to multiple observations (e.g., 10), because (1) explicit feedback is known to be correct (whereas observations may be wrong); and (2) the fact that the user bothered to provide feedback indicates that the information is important to them.

Exemplary Methods of Making Recommendations

Figure 7:
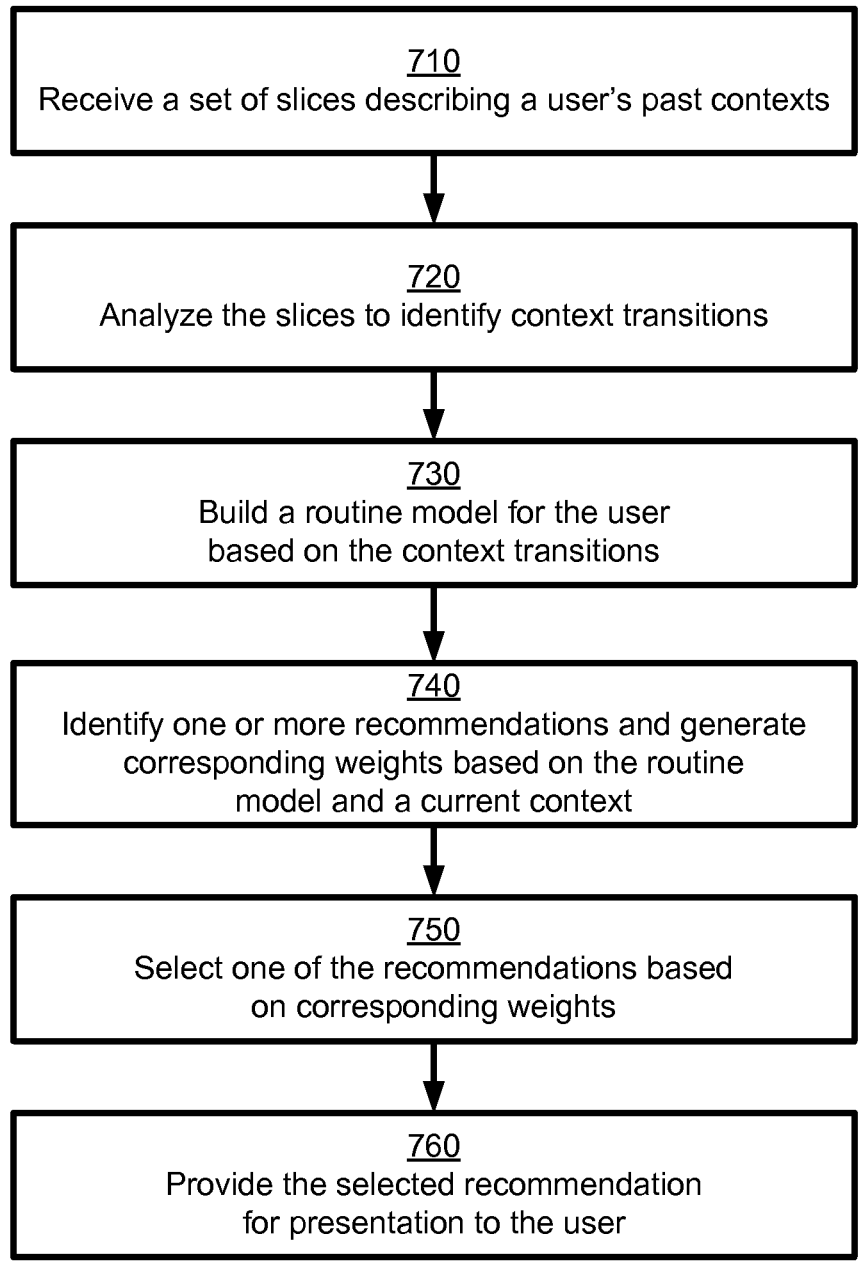
FIG. 7 is a flow chart illustrating a method of making a recommendation based on a user's routine in accordance with an embodiment of the invention.

FIG. 7 illustrates a method of making a recommendation based on a user's routine model, according to one embodiment. The steps of FIG. 7 are illustrated from the perspective of the recommendation agent module 140 performing the method. However, some or all of the steps may be performed by other entities and/or components. In addition, some embodiments may perform the steps in parallel, perform the steps in different orders, or perform different steps.

In the illustrated embodiment, the method begins with the recommendation agent module 140 receiving 710 a set of slices describing the user's past contexts, such as those produced by the context refiner module 120, and stored in contextual history storage 130. The recommendation agent module 140 then analyzes 720 the received slices to identify a set of transitions between contexts and uses the set of transitions to build 730 a routine model for the user, as described above with reference to FIG. 6.

The recommendation agent module 140 identifies 740 one or more recommendations from the recommendation corpus 660 based on the user's current context and the transition rules in the user's routine model. To do this, the recommendation agent module 140 identifies transition rules in the user's routine model with a source that matches the user's current context. Recall that most real-life situations can be described by multiple contexts at varying levels of specificity; accordingly, the recommendation agent module 140 identifies transition rules that match the user's current neighborhood, current time, current venue, current venue category, and the like, as well as combinations of these contexts. The recommendation agent module 140 then finds the destinations of these transition rules and instantiates them to identify 740 one or more recommendations, where instantiation involves finding a recommendable item (e.g., a venue, an event, or the like) in the corpus 660 with associated contexts that match the destination contexts of at least one of the transition rules. The recommendation agent module 140 assigns each of these recommendations a weight based on the probability of the rule or rules used to generate it. Additionally, the weight may be adjusted based on venue attributes and the user's known preferences.

For example, the user may currently be at a coffee shop in the Capitol Hill neighborhood, at 5:00 PM. Applicable rules say that the user often goes to the University District from Capitol Hill, that he often goes to an ice cream place after getting coffee, that he often goes to the supermarket at around 5:00 PM, and that he often heads home around 6:00 PM. Instantiating these rules, the recommendation agent module 140 identifies 740 corresponding recommendations, for example, a park in the University District, an ice cream shop in Capitol Hill, an ice cream shop on the way home, and a supermarket on the way home. The recommendation agent module 140 assigns a weight to each recommendation based on the rules that caused them to be identified 740. For example, in the case of the second ice cream shop, the weight is determined from both the "coffee then ice cream" rule and the "go home around this time" rule. In some embodiments, the weights are adjusted based on venue attributes; for example, if the first ice cream shop is highly-rated by other users, the recommendation agent module 140 gives it a boost. Finally, the recommendation agent module 140 can adjust the weights based on the user's preferences. For example, if the user enjoys going to parks, the park recommendation can be given a boost, even though none of the rules used in generating the recommendations explicitly mention parks.

Once the recommendation agent module 140 has identified 740 one or more recommendations, the recommendation agent module selects 750 one of the recommendations based on the corresponding weights. In one embodiment, the recommendation agent module 140 selects the recommendation with the highest weight. In another embodiment, the recommendation agent module 140 assigns a probability of selection to each possible recommendation based on the corresponding weight and selects from among them using a random number generator. In further embodiments (not shown), more than one of the possible recommendations is selected. For example, the recommendation agent module 140 may select the five most highly weighted recommendations.

Having selected 750 the recommendation (or recommendations), the recommendation agent module 140 provides 760 the selected recommendation for presentation to the user. In one embodiment, the recommendation agent 140 runs on the user's mobile device, which then presents the recommendation to the user. For example, the recommendation can be presented visually and/or audibly by a dedicated app executing on the user's mobile device. In another embodiment, the recommendation agent module 140 is implemented at a recommendation service provider's server, which provides 760 the recommendation by sending it to the user's mobile device for presentation. For example, the recommendation can be sent to a dedicated app via the Internet, sent via SMS text message, sent via multimedia message, and the like.

In one embodiment, the recommendation agent module 140 includes one or more reasons with the selected recommendation, explaining why the recommendation was made, which is presented in conjunction with the recommendation. For example, in the example of a user at a coffee shop in the Capitol Hill neighborhood used earlier, the first ice cream recommendation could be given the reasons "You often get ice cream after getting coffee" and "This shop is highly rated by reviewers." The supermarket could be presented with the reasons "You often go to a supermarket at this time" and "It's on your way home."

In one embodiment, the user's routine model can also be used to generate recommendations for the future. In this case, the recommendation agent module 140 uses the user's routine model to predict a context that is likely for the user at a given time in the future and identifies 740 recommendations based on that context, rather than the user's current context.

Figure 8:
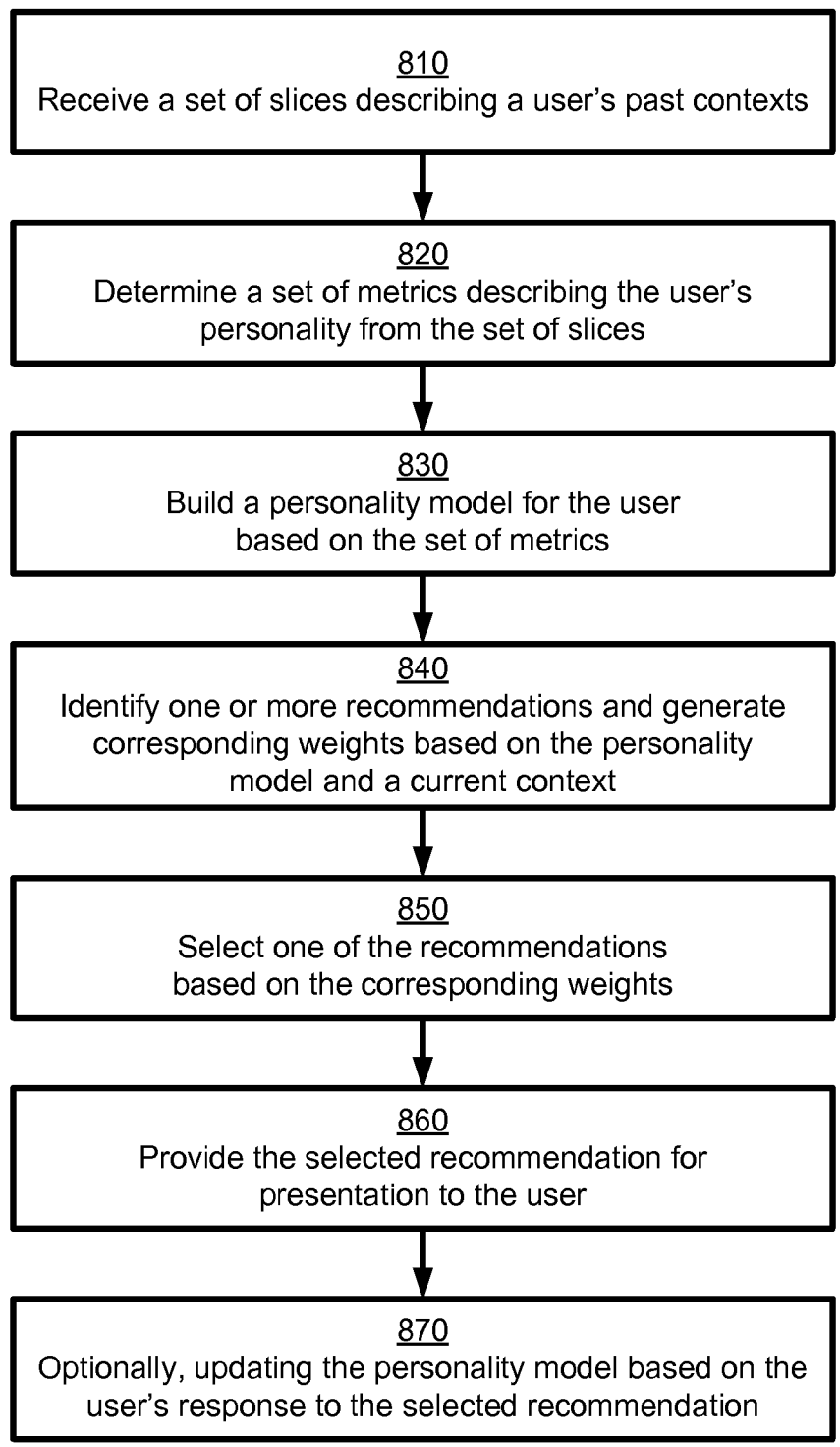
FIG. 8 is a flow chart illustrating a method of making a recommendation based on personality metrics for a user in accordance with an embodiment of the invention.

FIG. 8 illustrates a method of making a recommendation based on a user's personality model, according to one embodiment. The steps of FIG. 8 are illustrated from the perspective of the recommendation agent module 140 performing the method. However, some or all of the steps may be performed by other entities and/or components. In addition, some embodiments may perform the steps in parallel, perform the steps in different orders, or perform different steps.

In the illustrated embodiment, the method begins with the recommendation agent module 140 receiving 810 a set of slices describing the user's past contexts, such as those produced by the context refiner module 120, and stored in contextual history storage 130. The recommendation agent module 140 then determines 820 a set of metrics (e.g., a position of each of the personality dimensions described above) describing the user's personality and builds 830 a personality model for the user, as described above with reference to FIG. 6.

The recommendation agent module 140 identifies 840 one or more recommendations from the recommendation corpus 660 for the user based on the user's current context and personality model. In one embodiment, the recommendation agent module 140 identifies 840 a set of possible recommendations from the recommendation corpus 660 that are within a predetermined distance (e.g., 1 mile) of the user's current position. In other embodiments, the possible recommendations are identified 840 in other manners, such as by using the user's routine model, as described above.

However the possible recommendations are determined, the recommendation agent module 140 compares the personality metrics in the user's personality model with metadata associated with identified recommendations indicating the personality types that are likely to react positively to the corresponding recommendation. The recommendation agent module 140 then assigns each of the possible recommendations with a weight based on how closely the recommendation's personality profile, as indicated by the corresponding metadata, matches that of the user.

Once the recommendation agent module 140 has identified 840 one or more recommendations, the recommendation agent module selects 850 one of the recommendations based on the corresponding weights. In one embodiment, the recommendation agent module 140 selects the recommendation with the highest weight. In another embodiment, the recommendation agent module 140 assigns a probability of selection to each possible recommendation based on the corresponding weight and selects from among them using a random number generator. In further embodiments (not shown), more than one of the possible recommendations is selected. For example, the recommendation agent module 140 may select the five most highly weighted recommendations.

Having selected 850 the recommendation (or recommendations), the recommendation agent module 140 provides 860 the selected recommendation for presentation to the user. In one embodiment, the recommendation agent 140 runs on the user's mobile device, which then presents the recommendation to the user. For example, the recommendation can be presented visually and/or audibly by a dedicated app executing on the user's mobile device. In another embodiment, the recommendation agent module 140 is implemented at a recommendation service provider's server, which provides 860 the recommendation by sending it to the user's mobile device for presentation. For example, the recommendation can be sent to a dedicated app via the Internet, sent via SMS text message, sent via multimedia message, and the like.

In one embodiment, the recommendation agent module 140 includes reasons with the provided recommendation, explaining why the recommendation was made. For example, if the user has a low novelty score, a recommendation for a new restaurant may include the reason "your friends recommend this place" and/or "this restaurant is owned by the same people as [this other place] you visit often."

In some embodiment, the user's personality model is updated 870 based on how the user responds to the selected recommendation. As described above with reference to the feedback module 640 of FIG. 6, both implicit and explicit feedback regarding the user's response to delivered recommendations provides additional information about the user's personality and interests. Therefore, this feedback can be used to continuously improve the user's personality model and, consequently, the relevance of the recommendations provided in future.

Additional Configuration Considerations

A computer is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on a storage device, loaded into memory, and executed by a processor.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise. Upon reading this disclosure, those of skill in the art will appreciate still additional alternative structural and functional designs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of creating a customized recommendation agent for a user, the method comprising:
   obtaining a plurality of labelled context slices derived from context data associated with a user, each labelled context slice including a time, a location and a user context label specifying at least a place inferred from the location;
   obtaining place features of places included in the obtained plurality of labelled context slices, the obtained place features relevant to personality traits of the user;
   identifying, using the plurality of labelled context slices, one or more home areas corresponding to one or more places at which the user has spent a majority of time spanned by the labelled context slices;
   identifying, from the places included in the plurality of labelled context slices, non-home areas comprising places that do not correspond to a home area;
   determining a home area statistic and non-home area statistics from the obtained place features, the home area statistic describing place features of the one or more home areas, the non-home area statistics describing place features of the non-home areas;
   determining, by a processor, a plurality of personality metrics based on the home area statistic and the non-home area statistics, each personality metric quantifying a position of the user on a corresponding one of a plurality of personality trait dimensions, wherein determining the plurality of personality metrics comprises applying a machine learning algorithm to the places to determine the plurality of personality metrics, the machine learning algorithm trained by:
      obtaining personality scores of each user of a baseline group for the plurality of metrics;
      obtaining baseline contextual slices for each user of the baseline group, the baseline contextual slices derived from context data associated with the user of the baseline group, the baseline contextual slices including locations and baseline contextual labels specifying places inferred from the locations; and
      training the machine learning algorithm to predict the personality scores using the baseline contextual labels from the baseline contextual slices obtained for each user; and
   creating the customized recommendation agent configured to provide a recommendation to the user responsive to the plurality of personality metrics indicating the user is likely to find value in the recommendation.

2. The method of claim 1, wherein the plurality of personality trait dimensions include at least two of: desire for novelty, desire for extravagance, willingness to travel, love of the outdoors, preference for physical activity, and desire for solitude.

3. The method of claim 1, wherein providing the recommendation further comprises:
   identifying a reason why the recommendation was selected; and
   providing the reason for presentation to the user in conjunction with the recommendation.

4. The method of claim 1, wherein providing the recommendation to the user comprises:
   receiving an input context associated with the user;

selecting the recommendation from a corpus of recommendations based on the plurality of personality metrics and the input context; and providing the recommendation for presentation to the user.

5. The method of claim 4, wherein selecting the recommendation comprises:

calculating a weight for each of a plurality of recommendations from the corpus, each weight based on a degree of correspondence between the plurality of personality metrics and a corresponding recommendation; and selecting the recommendation from the plurality of recommendations responsive to the weight corresponding to the recommendation.

6. The method of claim 5, wherein the recommendation corresponds to a venue, the method further comprising:

adjusting the weight corresponding to the recommendation based on a rating for the venue provided by another user.

7. The method of claim 1, further comprising:

receiving feedback indicating how the user responded to the recommendation; and updating at least one personality metric of the plurality based on the feedback.

8. The method of claim 7, wherein the feedback indicates one of: the user following the recommendation, the user adding the recommendations to a plan, the user partially following the recommendation, or the user rejecting the recommendation.

9. The method of claim 1, further comprising:

providing the user with a series of questions, each question a binary choice that determines affinity for one of the personality trait dimensions; and adjusting at least one personality metric of the plurality based on the user's responses to the series of questions.

10. The method of claim 1, wherein obtaining the place features comprises determining categories that group similar places, and wherein determining the non-home area statistics comprises determining frequencies of visits to different categories of the non-home areas.

11. The method of claim 1, wherein obtaining the place features comprises determining distances from each of the non-home areas to a geographically nearest home area, and wherein determining the non-home area statistics comprises determining a non-home area statistic summarizing the determined distances from each of the non-home areas to a geographically nearest home area.

12. The method of claim 1, wherein determining the home area statistic comprises determining a proportion of visits to one of the home areas relative to total visits to the places from the plurality of labelled context slices.

13. A non-transitory computer-readable storage medium comprising executable computer program code, the computer program code comprising instructions for:

obtaining a plurality of labelled context slices derived from context data associated with a user, each labelled context slice including a time, a location and a user context label specifying at least a place inferred from the location;

obtaining place features of places included in the obtained plurality of labelled context slices, the obtained place features relevant to personality traits of the user;

identifying, using the plurality of labelled context slices, one or more home areas corresponding to one or more places at which the user has spent a majority of time spanned by the labelled context slices;

identifying, from the places included in the plurality of labelled context slices, non-home areas comprising places that do not correspond to a home area;

determining a home area statistic and non-home area statistics from the obtained place features, the home area statistic describing place features of the one or more home areas, the non-home area statistics describing place features of the non-home areas;

determining, by a processor, a plurality of personality metrics based on the home area statistic and the non-home area statistics, each personality metric quantifying a position of the user on a corresponding one of a plurality of personality trait dimensions, wherein determining the plurality of personality metrics comprises applying a machine learning algorithm to the places to determine the plurality of personality metrics, the machine learning algorithm trained by:

obtaining personality scores of each user of a baseline group for the plurality of metrics;

obtaining baseline contextual slices for each user of the baseline group, the baseline contextual slices derived from context data associated with the user of the baseline group, the baseline contextual slices including locations and baseline contextual labels specifying places inferred from the locations; and training the machine learning algorithm to predict the personality scores using the baseline contextual labels from the baseline contextual slices obtained for each user; and creating a customized recommendation agent configured to provide a recommendation to the user responsive to the plurality of personality metrics indicating the user is likely to find value in the recommendation.

14. The non-transitory computer-readable storage medium of claim 13, wherein the computer program code further comprises instructions for:

identifying a reason why the recommendation was selected; and providing the reason to the user in conjunction with the recommendation.

15. The non-transitory computer-readable storage medium of claim 13, wherein selecting the recommendation comprises:

receiving an input context associated with the user;

selecting the recommendation from a corpus of recommendations based on the plurality of personality metrics and the input context;

calculating a weight for each of a plurality of recommendations from the corpus, each weight based on a degree of correspondence between the plurality of personality metrics and a corresponding recommendation; and selecting the recommendation from the plurality of recommendations responsive to the weight corresponding to the recommendation; and providing the recommendation for presentation to the user.

16. The non-transitory computer-readable storage medium of claim 15, wherein the recommendation corresponds to a venue, the method further comprising:

adjusting the weight corresponding to the recommendation based on a rating for the venue provided by another user.

17. The non-transitory computer-readable storage medium of claim 13, wherein the computer program code further comprises instructions for:

obtaining feedback indicating how the user responded to the recommendation; and updating at least one personality metric of the plurality based on the feedback.

18. The non-transitory computer-readable storage medium of claim 13, wherein the computer program code further comprises instructions for:
  providing the user with a series of questions, each question a binary choice that determines affinity for one of the personality trait dimensions; and
  adjusting at least one personality metric of the plurality based on the user's responses to the series of questions.

* * * * *